United States Patent Office 3,766,215
Patented Oct. 16, 1973

3,766,215
PROCESS FOR THE PREPARATION OF ADDUCTS FROM MALEIC ANHYDRIDE AND LIQUID, LOW-MOLECULAR WEIGHT POLYBUTADIENES
Karl-Dieter Hesse, Marl, and Klaus Gorke, Hullern, Germany, assignors to Chemische Werke Huels Aktiengesellschaft, Marl, Germany
No Drawing. Filed Mar. 16, 1971, Ser. No. 124,924
Claims priority, application Germany, Mar. 19, 1970, P 20 13 096.5
Int. Cl. C07c 57/02; C08f 17/00
U.S. Cl. 260—346.8
10 Claims

ABSTRACT OF THE DISCLOSURE

Adducts of liquid polybutadienes and maleic anhydride of a viscosity and color suitable for the production of synthetic varnishes are produced by conducting the reaction in the presence of a chelating agent, e.g., ethylenediaminetetraacetic acid or the disodium salt thereof.

BACKGROUND OF THE INVENTION

This invention relates to a process for the preparation of adducts of maleic anhydride and liquid polybutadienes, including copolymers of butadiene and at least one other diolefin or olefin.

It is known from German Pat. No. 1,219,684 and U.S. Pat. 3,546,184 that high-quality adducts of liquid, low-molecular polybutadienes and maleic anhydride can be prepared in the presence of copper compounds. In this process, the addition of copper salts prevents gelling or too high an increase in viscosity of the charge during the reaction. A disadvantage of this method is that when the resulting adducts are use in the preparation of varnishes, the adducts, due to the copper additive, exhibit a deep brown or black color. Non-discoloring stabilizers (French Pat. No. 1,332,596) cannot be employed, because they greatly impair the air drying properties of the varnish films. Moreover, they do not control the viscosity of the adducts as well as the copper salts.

SUMMARY OF THE INVENTION

According to this invention, non-gelled adducts of an acceptable color are obtained from maleic anhydride and liquid polybutadienes and liquid copolymers of butadiene and at least one other diolefin or olefin having viscosities of from 100 to 500,000 centipoises at 20° C. by heating the starting liquid polymer with maleic anhydride in the presence of an inhibitor consisting essentially of an unchelated metal chelating agent.

Any polymer of polybutadiene which is liquid at room temperature can be employed as starting polymer for the reaction of the process of this invention, e.g., polymers having a viscosity of from 100 to 500,000 cp./20° C., preferably from 200 to 50,000 cp./20° C., including, homopolymers and copolymers with another diene and/or an olefin. Such polymers preferably have a molecular weight of about 400 to 10,000, more preferably about 700 to 5000. Especially preferred are liquid polymers having a viscosity of less than 5,000 cp./20° C., and particularly those having a viscosity of less than 1,000 cp./20° C.

Preferred starting polymers are liquid butadiene polymers produced in the presence of an organometal/nickel catalyst system. These polymers generally contain butadiene polymer units of which at least 50%, preferably at least 60%, e.g., 50–90%, have the cis-1,4-structure, substantially all of the remainder, e.g., 10–50%, having the trans - 1,4 - structure, with less than 3%, usually less than 1%, having 1,2-vinyl structure. The polybutadienes can have incorporated therein up to 30% of another diolefin, e.g., isoprene or 2,3-dimethyl-1,3-butadiene, or both, and/or an olefin, e.g., one or more of styrene, propene, and butene-1. Especially preferred as starting material are liquid polybutadiene homopolymers obtained as described in German published application DAS 1,186,-631.

The chelating agents employed in the process of this invention are compounds which can bind polyvalent metals in chelated form. Examples of preferred chelating agents are ethylenediaminetetraacetic acid and the alkali metal salts thereof, nitrilotriacetic acid and the alkaline metal salts thereof, diacetyl dioxime, and preferably 1,3-dicarbonyl compounds, such as, for example, acetylacetone. The preferred alkali metal salts are the sodium salts. Metal chelating agents include polybasic acids and their alkali-metal salts, e.g., dibasic, tribasic and tetrabasic acids, especially those which are internally partially neutralized by the presence of one or more amino groups, e.g., amino-di- and tri-alkanoic acids and alkylenediaminopolybasic alkanoic acids. Another well known type is β-diketones and their functional derivatives. For a description listing of chelating agents for di- and polyvalent metals, see Martell and Calvin, "Chemistry of the Metal Chelate Compounds" (Prentice-Hall, Inc., N.Y., 1952), especially Appendix I, and other later publications on the subject.

The amount of the complexing agent employed is about 0.005–1.0%, preferably 0.01–0.5% by weight, based on the total weight of the reaction charge.

The gellation inhibitor employed in the process of this invention consists essentially of a metal chelating agent in unchelated form, i.e., substantially free of chelated metal. The term "consisting essentially of" as used herein does not preclude the presence of other conventional stabilizers, viscosity regulators, etc., in amounts which do not interfere with the gellation inhibiting and viscosity regulating activity of the metal chelating agent.

The process of this invention is preferably conducted so that first the starting components are mixed under an inert gas atmosphere, e.g., nitrogen or carbon dioxide, and then heated, under an inert gas atmosphere, to temperatures of between 130 and 220° C., preferably between 160 and 200° C., if possible under agitation. It is advantageous to purge the reaction vessel several times with inert gas prior to heating, and optionally also during the heating step. Depending on the amount of maleic anhydride and the temperature employed, the reaction is usually terminated after 1–5 hours. The reaction can be monitored by titration of samples or residual unreacted maleic anhydride or by viscosity measurements.

The process can be conducted in the absence of an inert gas atmosphere, especially when both a metal chelating agent and a copper compound are employed simultaneously, without gelled products being produced.

The thus-produced adducts can contain up to 50% by weight of maleic anhydride. As the content of maleic anhydride increases, the viscosity of the adducts likewise increases. Those which contain 20% or more by weight of incorporated maleic anhydride are viscid to solid at room temperature. The densities of the adducts range, depending on their anhydride content, between 0.89 and 1.2. Their iodine numbers range from about 200 to 460 g. of iodine per 100 g. of substance. The adducts are soluble in many organic solvents, such as, for example, in aliphatic, cycloaliphatic, aromatic hydrocarbons, including mineral spirit, cyclohexane, benzene, toluene, xylene, cumene and styrene, chlorinated hydrocarbons, e.g.

chloroform and chlorobenzene, esters, e.g., ethyl acetate, butyl acetate and methyl acrylate, ketones, e.g., acetone and cyclohexanone, ethers, e.g., dioxane and alcohols, e.g., butanol and octanol, as well as in mixtures of these solvents.

The adducts produced in accordance with this invention can be used as air- and oven-drying coating compositions and binders. They are also useful for the production of alkyl resins, water-soluble coating compositions, and as curing agents for polyepoxides.

The adducts of this invention can be readily converted into low-molecular weight polymers which contain carboxyl groups by treatment with water at temperatures of 100–200° C., preferably under an inert gas atmosphere.

By cross-linking the adducts or the carbonyl group-containing water-treated products produced therefrom with di- or polyfunctional compounds, e.g., polyols, polymercaptans, polyamines, polyphenols, polyisocyanates, etc., coatings or shaped articles are obtained, the properties of which can be varied widely, depending on the anhydride content of the adducts and the cross-linking components.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 100 parts by weight of a liquid polybutadiene, produced with an organoaluminum/nickel catalyst system, is reacted with varying amounts of maleic anhydride in the presence of a metal chelating additive. The starting liquid polybutadiene has the following properties:

viscosity (cp at 20° C.): 750
density ($d_4^{20}$; g./mL.): 0.91
iodine number (grams of iodine per 100 g. of substance): 450
molecular weight (vapor pressure osmosis): 1400
Distribution of double bonds (percent):
    centrally positioned cis-: 75
    centrally positioned trans-: 25
    centrally positioned vinyl-: <1

EXAMPLES 1–5

Ten parts by weight of maleic anhydride— reaction temperature: 200° C.
reaction time: 2 hours
inert gas: nitrogen (without excess pressure)

| Example | Additive | Parts by weight | Viscosity of the adduct (cp./20° C.) | Color of the adduct |
|---|---|---|---|---|
| 1 | None | | 11,550 | Light yellow. |
| 2 | Acetylacetone | 0.1 | 6,820 | Do. |
| 3 | Trilon A [1] | 0.3 | 7,400 | Yellowish brown. |
| 4 | Trilon B [2] | 0.37 | 7,030 | Do. |
| 5 | Acetylacetone plus Cu naphthenate. | { 0.1 / 0.25 } | 6,770 | Brown. |

[1] $N(CH_2 \cdot CO_2Na)_3$ = sodium nitriloacetic acid.
[2] $(CH_2 \cdot CO_2Na)_2N \cdot C_2H_4 \cdot N(CH_2 \cdot CO_2Na)_2$ = sodium ethylenediaminotetramethyl carboxylic acid.

EXAMPLES 6–11

Twenty parts by weight of maleic anhydride— reaction temperature: 200° C.
reaction time: 2 hours
inert gas: nitrogen (2 atmospheres gauges)

| Example | Additive | Parts by weight | Viscosity of the adduct (cp./20° C.) | Color of the adduct |
|---|---|---|---|---|
| 6 | None | | 980,000 | Light yellow. |
| 7 | Cu naphthenate | 0.25 | 750,000 | Brown. |
| 8 | Acetylacetone | 0.1 | 345,000 | Light yellow. |
| 9 | do | 0.025 | 438,000 | Do. |
| 10 | do | 0.5 | 440,000 | Do. |
| 11 | Cu naphthenate plus acetylacetone. | { 0.25 / 0.025 } | 310,000 | Brown. |

EXAMPLES 12–15

Twenty parts by weight of maleic anhydride reaction temperature: 200° C.
reaction time: 3 hours
without inert gas

| Example | Additive | Parts by weight | Viscosity of the adduct Cp./20° C. | Viscosity of the adduct Cp./50° C. | Color of the adduct |
|---|---|---|---|---|---|
| 12 | None | | (1) | (1) | Light yellow. |
| 13 | Acetylacetone | 0.1 | (1) | 30·10⁶ | Do. |
| 14 | Cu naphthenate | 0.25 | 2.6·10⁵ | 50,000 | Brown. |
| 15 | Cu naphthenate plus acetylacetone | { 0.25 / 0.1 } | 612,000 | 26,000 | Do. |

[1] Not measurable.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of an adduct of maleic anhydride and a liquid polymer produced in the presence of an organo metal/nickel catalyst and selected from the group consisting of a polybutadiene homopolymer and a copolymer of butadiene and another diolefin or olefin, said liquid polymer having a viscosity of from 100 to 500,000 cp./20° C., by heating the liquid polymer with maleic anhydride in the presence of an inhibitor, the improvement which comprises employing from 0.005–1%, based on the total weight of the mixture, of an inhibitor consisting essentially of an organic metal chelating agent substantially free of chelated metal and capable of binding polyvalent metals in chelated form and selected from the group consisting of β-diketones, diacetyl dioxime and dibasic, tribasic and tetrabasic acids internally partially neutralized by one or more amino groups.

2. A process according to claim 1 wherein the liquid polymer has a viscosity of from 200 to 50,000.

3. A process according to claim 1 wherein the liquid polymer is a polybutadiene which contains more than 50% cis-double bonds.

4. A process according to claim 3 wherein the liquid polybutadiene contains more than 60% cis-double bonds.

5. A process according to claim 1 wherein the chelating agent is a β-diketone compound.

6. A process according to claim 5 wherein the chelating agent is acetylacetone.

7. A process according to claim 1 wherein the liquid polymer is a polybutadiene having a viscosity of from 200 to 50,000 and a cis-double bond content of more than 60%.

8. A process according to claim 7 wherein the chelating agent is acetylacetone.

9. A process according to claim 1 wherein the chelating agent is a dibasic, tribasic or tetrabasic acid internally partially neutralized by one or more amino groups.

10. A process according to claim 9 wherein the chelating agent is ethylenediaminetetraacetic acid.

References Cited
FOREIGN PATENTS
1,332,596   6/1963   France.

OTHER REFERENCES

Martell et al.: Chemistry of the Metal Chelate Compounds (1952), Prentice-Hall, Inc., pp. 471 and 511.

ALEX MAZEL, Primary Examiner

B. DENTZ, Assistant Examiner

U.S. Cl. X.R.

260—78.4 D, 78.5 BB; 117—161